United States Patent
Li et al.

(10) Patent No.: US 9,110,936 B2
(45) Date of Patent: Aug. 18, 2015

(54) USING INDEX PARTITIONING AND RECONCILIATION FOR DATA DEDUPLICATION

(75) Inventors: Jin Li, Bellevue, WA (US); Sudipta Sengupta, Redmond, WA (US); Ran Kalach, Bellevue, WA (US); Ronakkumar N. Desai, Redmond, WA (US); Paul Adrian Oltean, Redmond, WA (US); James Robert Benton, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 12/979,748

(22) Filed: Dec. 28, 2010

(65) Prior Publication Data

US 2012/0166401 A1      Jun. 28, 2012

(51) Int. Cl.
    *G06F 17/30*         (2006.01)
(52) U.S. Cl.
    CPC ...... *G06F 17/3033* (2013.01); *G06F 17/30303* (2013.01); *G06F 17/30489* (2013.01)
(58) Field of Classification Search
    CPC .................. G06F 17/30097; G06F 17/30109; G06F 17/30159
    USPC .......................................... 707/697, 698, 827
    See application file for complete search history.

(56) References Cited

U.S. PATENT DOCUMENTS

| 7,457,934 B2 * | 11/2008 | Yagawa ........................ 711/170 |
| 7,567,188 B1 * | 7/2009 | Anglin et al. .................. 341/63 |
| 8,086,799 B2 * | 12/2011 | Mondal et al. ................ 711/116 |
| 2008/0005141 A1 | 1/2008 | Zheng et al. |

(Continued)

FOREIGN PATENT DOCUMENTS

| CN | 101241511 A | 8/2008 |
| CN | 101350869 A | 1/2009 |

(Continued)

OTHER PUBLICATIONS

Benjamin Zhu, Kai Li, Hugo Patterson; "Avoiding the Disk Bottleneck in the Data Domain Deduplication File System"; Published Date: Feb. 2008; 15 pages.

(Continued)

*Primary Examiner* — Khanh Pham
(74) *Attorney, Agent, or Firm* — Henry Gabryjelski; Stein Dolan; Micky Minhas

(57) ABSTRACT

The subject disclosure is directed towards a data deduplication technology in which a hash index service's index is partitioned into subspace indexes, with less than the entire hash index service's index cached to save memory. The subspace index is accessed to determine whether a data chunk already exists or needs to be indexed and stored. The index may be divided into subspaces based on criteria associated with the data to index, such as file type, data type, time of last usage, and so on. Also described is subspace reconciliation, in which duplicate entries in subspaces are detected so as to remove entries and chunks from the deduplication system. Subspace reconciliation may be performed at off-peak time, when more system resources are available, and may be interrupted if resources are needed. Subspaces to reconcile may be based on similarity, including via similarity of signatures that each compactly represents the subspace's hashes.

20 Claims, 8 Drawing Sheets

(56) References Cited

U.S. PATENT DOCUMENTS

| | | | |
|---|---|---|---|
| 2008/0294696 A1* | 11/2008 | Frandzel | 707/200 |
| 2009/0013129 A1 | 1/2009 | Bondurant et al. | |
| 2009/0177855 A1* | 7/2009 | Drews et al. | 711/162 |
| 2009/0210640 A1 | 8/2009 | Davis et al. | |
| 2009/0271454 A1 | 10/2009 | Anglin et al. | |
| 2010/0042790 A1 | 2/2010 | Mondal et al. | |
| 2010/0077013 A1 | 3/2010 | Clements et al. | |
| 2010/0250858 A1* | 9/2010 | Cremelie et al. | 711/136 |
| 2010/0250896 A1 | 9/2010 | Matze et al. | |
| 2011/0307447 A1* | 12/2011 | Sabaa et al. | 707/637 |
| 2012/0030477 A1* | 2/2012 | Lu et al. | 713/189 |
| 2012/0036319 A1* | 2/2012 | Bondurant | 711/111 |

FOREIGN PATENT DOCUMENTS

| | | |
|---|---|---|
| CN | 101706825 A | 5/2010 |
| CN | 101916171 A | 12/2010 |

OTHER PUBLICATIONS

IBM Developer Works; "Data deduplication in Tivoli Storage Manager V6.2 and V6.1"; Published Date: Jun. 10, 2010; 18 pages.

Austin T. Clements, Irfan Ahmad, Murali Vilayannur, Jinyuan Li; "Decentralized Deduplication in SAN Cluster File Systems" Retrieved Date: Oct. 20, 2010; 23 pages.

Biplob Debnath, Sudipta Sengupta, Jin Li; "ChunkStash: Speeding up Inline Storage Deduplication using Flash Memory"; Microsoft Research, Redmond, WA, University of Minnesota, Twin Cities; Published Date: Jun. 2010; 16 pages.

Ping Li, Arnd Christian Konig; "b-Bit Minwise Hashing"; WWW 2010, Apr. 26-30, 2010, Raleigh, North Carolina; 10 pages.

Giuseppe DeCandia, et al.; "Dynamo: Amazon's Highly Available Key-value Store"; SOSP '07, Oct. 14-17, 2007, Stevenson, Washington; 16 pages.

Jiansheng Wei, Hong Jiang, Ke Zhou; "MAD2: A Scalable High-Throughput Exact Deduplication Approach for Network backup Services"; IEEE; Published Date: 2010; 14 pages.

Hewlett Packard; "Understanding the HP Data Deduplication Strategy"—Retrieved Date: Oct. 20, 2010; 28 pages.

Business Management; "Comparing Deduplication Approaches: Technology Considerations for Enterprise Environments"; Copyright 2010 GDS Publishing Ltd.; Retrieved Date: Oct. 20, 2010; 4 pages.

Michael A. Olson, Keith Bostic, Margo Seltzer; "Berkeley DB"; Proceedings of the FREENIX Track: 1999 USENIX Annual Technical Conference, Monterey, CA, Jun. 6-11, 1999; 10 pages.

International Search Report and Written Opinion for PCT/US2011/067292 mailed Jul. 30, 2012; 8 pages.

"Office Action & Search Report Received for Chinese Patent Application No. 201110445282.2", Mailed Date: Dec. 24, 2013, 12 Pages including 5 pages English translation.

"Office Action Received for Chinese Patent Application No. 201110445282.2", Mailed Date: Jul. 17, 2014, 13 Pages including 5 pages English translation.

Office Action and Search Report received for Chinese Patent Application No. 201110445282.2, mailed Jan. 20, 2015, 14 pages, including 5 pages English translation.

\* cited by examiner

USING INDEX PARTITIONING AND RECONCILIATION FOR DATA DEDUPLICATION

CROSS-REFERENCE TO RELATED APPLICATIONS

The present application is related to copending U.S. patent applications entitled "Fast and Low-RAM-Footprint Indexing for Data Deduplication" Ser. Nos. 12/979,644 an d 12,979,669, and 331413.01), and "Adaptive Index for Data Deduplication" Ser. No. 12/979,681, filed concurrently herewith and hereby incorporated by reference.

BACKGROUND

Data deduplication (sometimes referred to as data optimization) refers to reducing the physical amount of bytes of data that need to be stored on disk or transmitted across a network, without compromising the fidelity or integrity of the original data, i.e., the reduction in bytes is lossless and the original data can be completely recovered. By reducing the resources needed to store and/or transmit data, data deduplication thus leads to savings in hardware costs (for storage and network transmission) and data-managements costs (e.g., backup). As the amount of digitally stored data grows, these cost savings become significant.

Data deduplication typically uses a combination of techniques for eliminating redundancy within and between persistently stored files. One technique operates to identify identical regions of data in one or multiple files, and physically storing only one unique region (chunk), while maintaining a pointer to that chunk in association with the file. Another technique is to mix data deduplication with compression, e.g., by storing compressed chunks.

In order to identify the chunks, the server that stores the chunks maintains a hash index service for the hashes of the chunks in the system. The hash does not have locality, i.e., chunk hashes for chunks in the same file are unrelated, and any edits to a given chunk's content create a very different (unrelated) hash value. Thus traditional database technology, such as B-tree indexing, leads to poor performance in index serving. Maintaining the entire index in memory provides good performance, but consumes too many resources. The server memory resource is needed by other server applications (e.g., in primary data deduplication scenarios), and for caching.

Prior backup-oriented data deduplication optimization has relied upon a look-ahead cache to reduce the amount of resources used in accessing the index on the server. However, data deduplication is no longer limited to data backup scenarios, and is moving towards being used as a primary data storage cluster accessed like any other storage device. The use of a look-ahead cache alone to reduce the resource usage is not an adequate solution.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a deduplication technology by which a hash index service's index is partitioned into subspace indexes, such that less than the entire scope of the hash index service's indexed dataset is loaded into memory at a time, thereby conserving the available memory.

When data to be deduplicated is received and chunked, and possibly compressed, the subspace index determines whether a hash value computed for that chunk matches a hash value of an entry in a primary memory (e.g., RAM) cache. If so, information by which the existing chunk is locatable is returned, otherwise the chunk is stored as a new chunk in chunk store and an entry for that hash value is added to the subspace index in association with a reference to that chunk.

In one aspect, the hash index service is divided into a plurality of subspace indexes based on one or more criteria, which may correspond to how the data to be deduplicated is partitioned. Example dividing/partitioning criteria include the data's file type, data type, location, an application that created the data, file usage pattern data, file access pattern data, file owner, file user type, namespace, file content, file metadata, learned criteria or adaptive criteria, or any other type of information that can be inferred as being characteristic to the file, as well as any combination of these.

In another aspect, one subspace may be periodically (or occasionally) reconciled with one or more other subspaces so as to eliminate any duplicate entries from the subspace being reconciled subspaces, and correspondingly delete its associated (duplicate) chunks. Such duplicate data chunks can arise across subspaces because subspaces may be deduplicated separately until and up to the point of reconciliation. As part of reconciliation, each reference to the chunk associated with the duplicate entry is updated to reference the remaining chunk. A reconciled subspace and a chunk store from which a chunk has been deleted may be compacted and/or overwritten with new data in various ways.

The subspace and the one or more other subspaces to reconcile may be selected based upon similar subspace types, similar subspace signatures, and/or based upon the subspace being an unreconciled subspace and the other subspaces having been previously reconciled with one another. A signature comprises a compact representation of the subspace's hashes, and may be computed/determined in various ways, e.g., based upon a min hash computation, a bloom filter, a min-hash and bloom filter combination, and so on.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
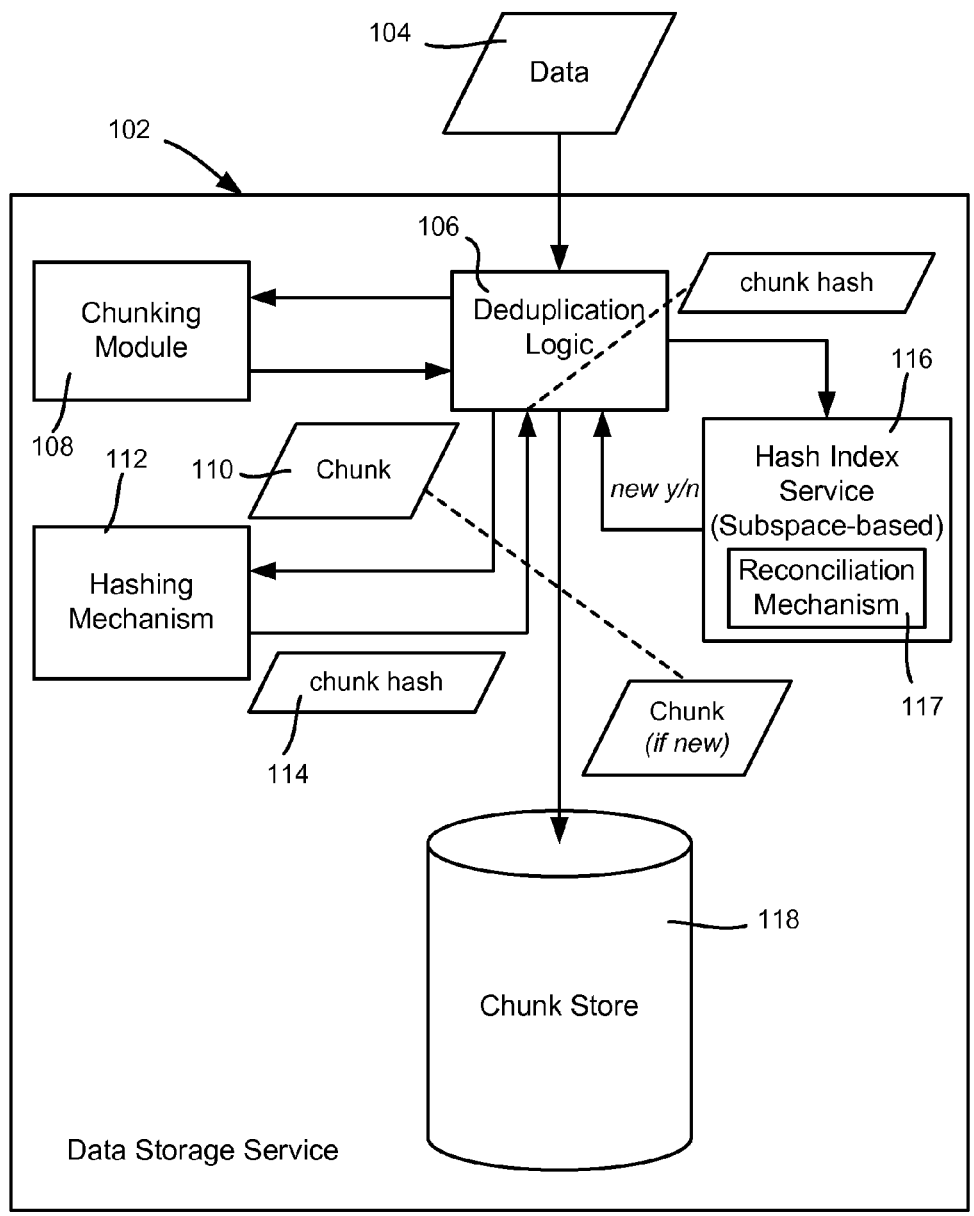
FIG. 1 is a block diagram representing example components of a data storage service configured for deduplication using a subspace-based hash index service.

Various aspects of the technology described herein are generally directed towards a deduplication system that operates by partitioning the global hash index into a number of subspaces. Each of the subspaces can be stored in the secondary storage device, e.g., on the hard disk. Depending on the data set currently in use, a subspace or part of a subspace can be actively loaded into memory, e.g., based upon the current system work load, resource availability, and which subspace is needed for indexing data chunks. When a subspace fills up, it may become a read-only subspace that may be used (e.g., as a cache) to locate chunks, with a new active subspace created to handle new chunks. Note that sealed subspaces are often the same size, but not necessarily.

Further, different subspaces can be reconciled to increase the quality of deduplication, (e.g., a higher deduplication ratio of their corresponding data chunks), and thereby increase the scalability of the data storage server. To this end, consider two subspaces selected for reconciliation, one as a source, and one as a destination. The hashes of one are compared against the hashes of the other to look for identical chunks, with any identical chunk removed from one chunk store, the entry potentially removed from one of the corresponding subspaces, and references to the removed chunk updated to point to the chunk that remains. Note that repeating the reconciliation operations between all the subspaces in the system will ultimately detect all the duplicates in the system, therefore maximizing the savings obtained from data deduplication.

In one aspect, to predict which subspaces may reconcile well with one another, a reconciliation process calculates a signature of the indexes in each subspace. The signature can be used by the data storage server to identify which subspaces are selected for reconciliation. This subspace selection process may first process the subspaces that are most likely to give the most space savings in reconciliation, for example. Because the subspace signature can be very compact, at off-peak times, the data storage server may be able to afford to load the signatures of all subspaces, so that it can optimally identify which subspaces are good deduplication candidates. Each subspace can be separately optimized, with a "hot" subspace (in which the content is modified or regularly read) being optimized for performance, while a "cold" subspace (in which the content comprises an older snapshot or infrequently accessed content) being optimized for data deduplication quality. Subspace can be reconciled at off-peak time to improve the data deduplication performance and/or quality.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in data processing, data indexing and data deduplication in general.

FIG. 1 shows example components of a content-aware data deduplication data storage system, such as implemented in a data/file storage service 102. The service 102 receives data 104 (a file, blob, or the like), and deduplication logic 106 processes the data for deduplication. To this end, the deduplication logic 106 provides the data 104 to a chunking module 108, which processes the content into chunks, such as according to the structure of the file (e.g., partition a media file into a media header and media body), or by using an algorithm to chunk the file contents based on fast hashing techniques (such fast hash functions include CRC and Rabin families of functions) that is repeatedly computed on a sliding window, where a chunk is being selected when the hash functions and the current chunk size/content meets certain heuristics. A chunk boundary is generally determined in a data-dependant fashion at positions for which the hash function satisfies a certain condition. The following description is with respect to one chunk 110, although it is understood that the data is typically partitioned into multiple chunks.

The deduplication logic 106 passes the chunk 110 to a hashing mechanism 112, which computes a hash of the chunk, referred to as the chunk hash 114. A strong hash function, e.g., a cryptographically secure SHA-256 or SHA-512 hash function or the like (which ensures an extremely low probability of collisions between hashes) may be used as the chunk hash 114 that uniquely identifies the chunk 110. Note that with such a secure hash, the probability of a hash collision is negligible, e.g., a hash collision is around thirty orders of magnitude less likely than a hardware error given the most reliable hardware currently available.

The chunk hash 114 is provided to a hash index service 116 (which includes or is coupled to a reconciliation mechanism 117). If the chunk hash 114 is found (that is, already exists) in the hash index service 116, a duplicated copy of the chunk 110 is considered to have been already deposited in the chunk store 118, and the current chunk need not to be further stored. Instead, any reference to this chunk may simply refer to the prior, existing chunk.

If the chunk hash 114 is not found in the hash index service 116, the chunk 110 is deposited into the chunk store 118, and the chunk hash 114 is deposited into the hash index service 116. As can be readily appreciated, given enough data over time, a great deal of storage may be saved by referencing a chunk instead of maintaining many separate instances of the same chunk of data. Chunks are often also compressed, saving even more storage; note that e hashes may be computed on the uncompressed chunks before compression, and/or hashes may be computed after compression.

The technology described herein is directed towards the architecture and algorithm of the hash index service 116, and more particularly towards a subspace-based hash index service, and the concept of subspace reconciliation.

In general, a subspace is a smaller part of the overall system's global index, and generally corresponds to an initial partitioning (division) of the available data that is to be deduplicated into a plurality of datasets. The partitioning is ordinarily planned such that the data corresponding to any subspace is likely to deduplicate well (many chunks will match) with other data for that subspace. The hashes for the global data chunks thus divide into subspace indexes, e.g., one subspace index for each respective partition of data. The data/hashes may be partitioned into subspaces based on virtually any criteria, such as file type (e.g., by extension), data type (e.g., images, text documents, and so on), location (e.g., machine, volume), the application that created the file, a file usage/access pattern (such as last modified time and the like), user ID (file owner), user types, namespaces (e.g., disk volumes), content and/or metadata (e.g. to cluster similar files), file classification information (provided either through manual or automatic methods), learned/adaptive criteria (e.g., from external feedback from an analysis of data that was previously deduplicated on this system or another system), or any other type of information that can be inferred or determined as being characteristic to the file. Note that any combination of some or all of the above partitions may be used, e.g., data with the same file type modified within the last month.

By way of example, partitioning the file namespace into index subspaces using the files' last-modify or last-access times as a criterion may be a useful partitioning scheme on the assumption that correlated data often tends to appear on the storage system around the same timeframe. For example, consider a file sent as an attachment to one-hundred users, in which eighty of them save the file to their own respective document repository. The system may partition the namespace into time ranges and treat every time range as a subspace.

As another example, partitioning by file type is based on the assumption that different types or type-groups have a better chance to have repeating chunks among themselves. For example, text-based formats (e.g., .txt, .xml, .html and so forth) may deduplicate well with each other, but not with files maintained in a zip format. The system (e.g., an administrator) may thus define related file-groups, such as {all text formats}, {Office 2007, zip}, and so forth, and treat the files that belong to a group as a subspace.

By partitioning data such that the corresponding hash indexes are subspaces, the subspaces indexes are able to be stored in a secondary device, such as a hard disk, while some form of an active subspace index is loaded into fast memory (e.g., RAM) to perform as a highly efficient (online) hash index service. For example, the data may be grouped by its partition (and corresponding subspace) before sending files/blobs of a group of data to the service 102, so that the active index only changes when group changes. Furthermore, before starting an optimization session, a variety of methods may be used to select which subspaces are going to be loaded (correlating the subspace with the files that are going to be deduplicated, e.g. based on insertion time), in order to maximize the savings during the subsequent deduplication process.

The partitioning of data and subspace indexing lowers the deduplication ratio (i.e., reduces deduplication space savings) because identical chunks may be indexed by difference index subspaces and thus stored in multiple locations. Further, because the subspaces are small (as their size can be controlled through configurable parameters) the system can ensure that the loaded subspaces will fit into primary storage (RAM) for the entire duration of the deduplication process. As described below, different subspaces can be reconciled (e.g., in an offline operation when the load of the server is low with respect to CPU, memory and I/O load) so that only one copy of any identical chunks that exist in two (or more) subspaces need be maintained, with the other discarded. While in some environments every subspace may be able to be reconciled with every other one, in other environments there are too many subspaces to reconcile all of them in such a way. As described below, each index subspace may be identified by a signature, with signature similarity (e.g., vector distance)/matching used to select subspaces for reconciliation that from their signatures appear to have significant deduplication opportunities and thus will likely reconcile well with each other.

Figure 2:
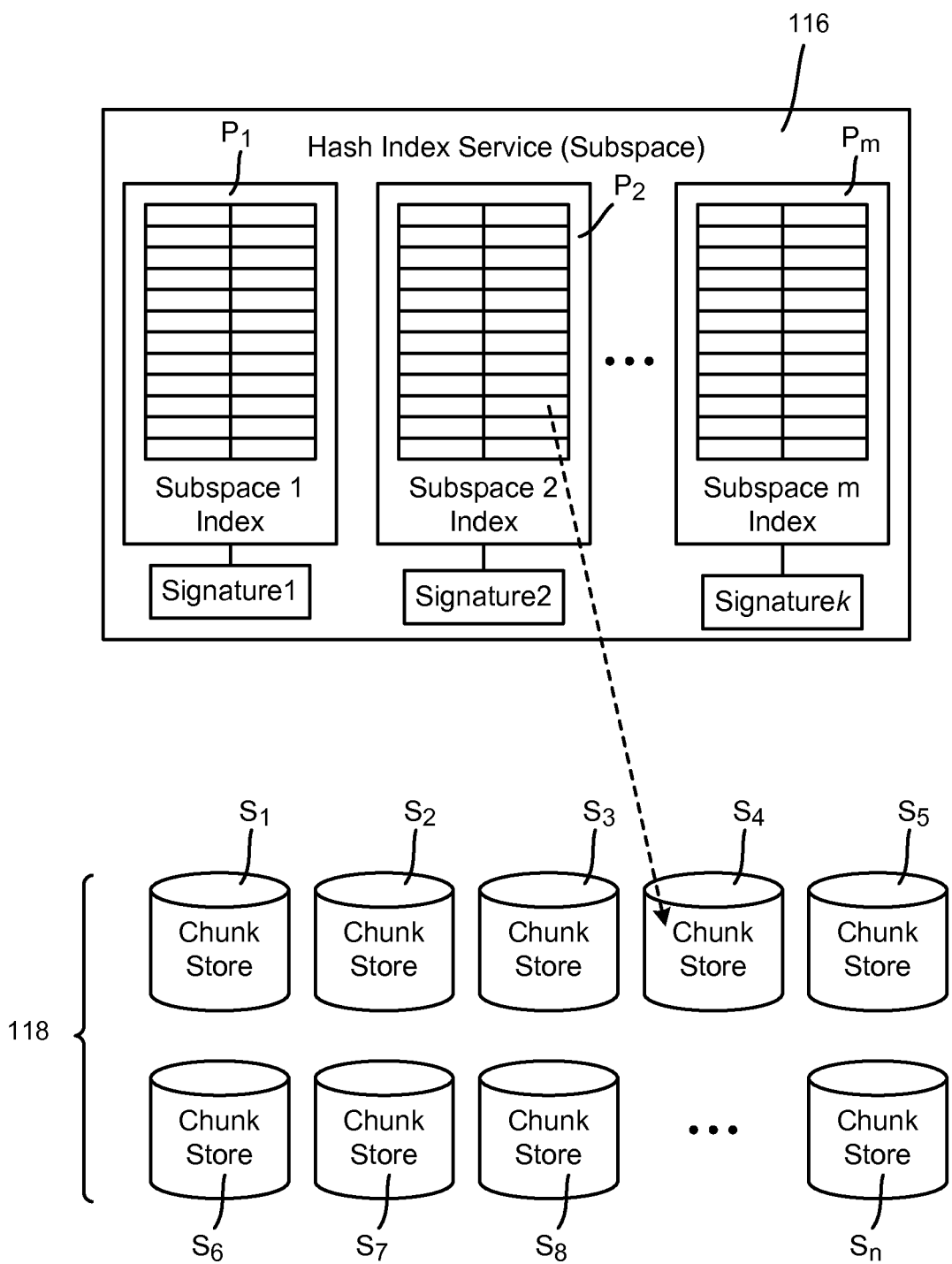
FIGS. 2-4 are representations showing relationships between subspaces and chunk stores used in data deduplication.
Figure 3:
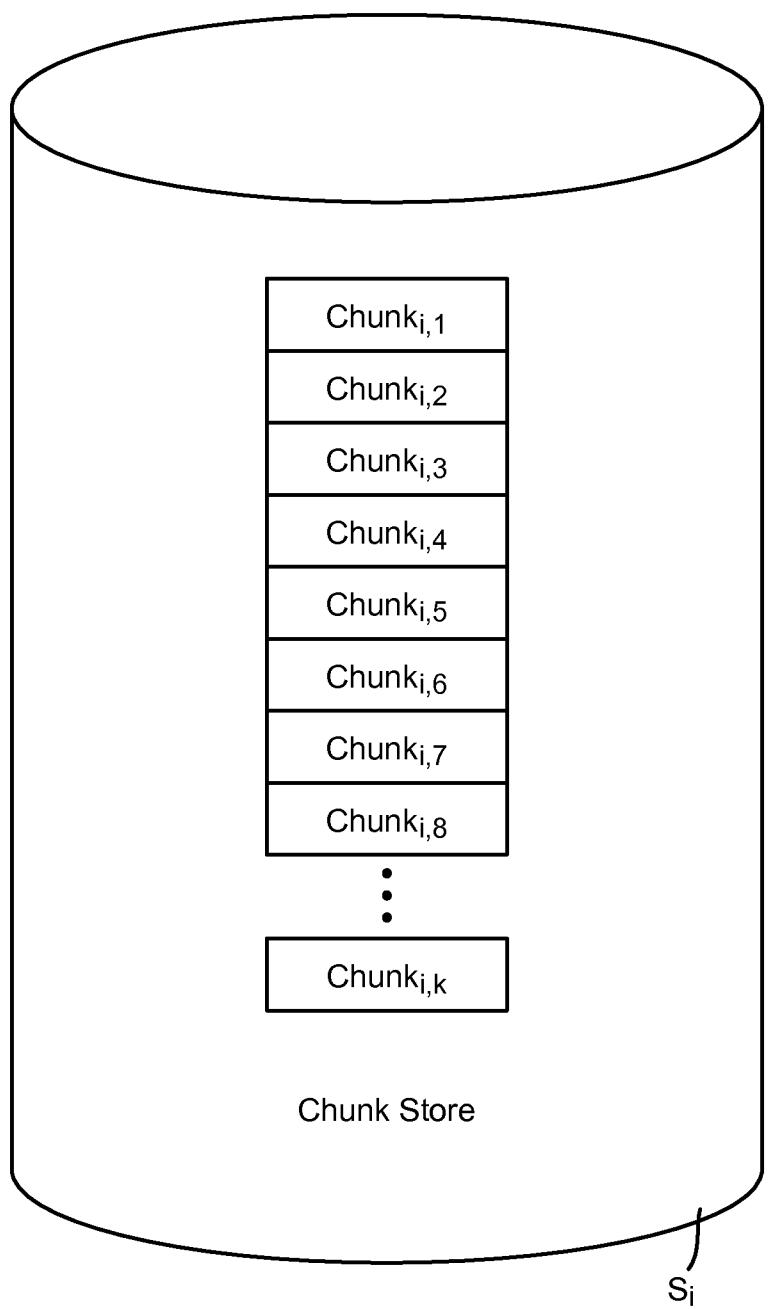

FIG. 2 shows an example architecture design of a hash index service 116 configured for subspace partitioning. As described above, the data/file storage service 102 includes a chunk store 118 and the hash index service 116, wherein the chunk store 118 maintains the chunk data, which is a region of data in one or multiple files. The chunk store 118 may contain two or more component stores, e.g., $S_1, S_2, \ldots, S_n$, wherein each store $S_i$ comprises a set of chunks identified by a set of chunk IDs, $c_{i,1}, c_{i,2}, \ldots, c_{i,k}$, as shown in FIG. 3. The chunk ID $c_{i,j}$ identifies the location of the chunk j in store $S_j$, and may be associated with an optional backward reference link to the file it belongs.

Figure 4:
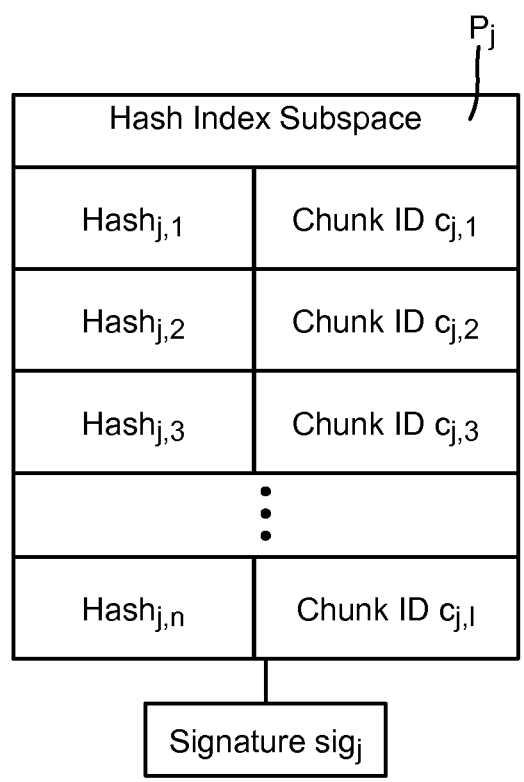

The hash index service 116 comprises the subspace indexes $P_1, P_2, \ldots, P_m$, wherein each subspace $P_j$ comprises a set of hashes $h_{j,1}, h_{j,2}, \ldots, h_{j,l}$, and the associated chunk ID $c_{j,1}, c_{j,2}, \ldots, c_{j,l}$ as generally represented in FIGS. 2 and 4. Note that each chunk ID corresponds to a chunk store location, as represented by the dashed arrow in FIG. 2 (although only one such arrow is shown for simplicity). Each subspace $P_j$ also may be identified with a signature $sig_j$ for deduplication optimization purposes, as described below. The subspace $P_j$ may also include a number of other sub-sampled representations, as described below.

It is possible in a system to establish a correspondence between a chunk store and an index subspace, e.g., each chunk store $s_i$ corresponds to one and only one index subspace $P_j$, however, an absolute correspondence is not necessary. It is also possible to allow an index subspace $P_j$ to point to chunks in (i.e., to have chunk ID belong to) multiple chunk stores. It is further possible for the chunks in a chunk store $s_i$ to be indexed by multiple subspaces. However, if the chunk store resides on hard drive or other device with slow random access performance (e.g., compared with SSD), and good read performance is desired, it may be desirable to limit the number of chunk stores to which an index subspaces $P_j$ points.

If the data/file storage service 102 comprises multiple machines, each machine may be assigned a number of chunk stores and a number of index subspaces. An index service, such as implemented through a centralized index service with fail over support (e.g., via the cluster service in Windows® Server 2008), or implemented through a decentralized index service, may be used to assign a particular chunk store $S_i$ or a particular index subspace $P_j$ to a machine.

Figure 5:
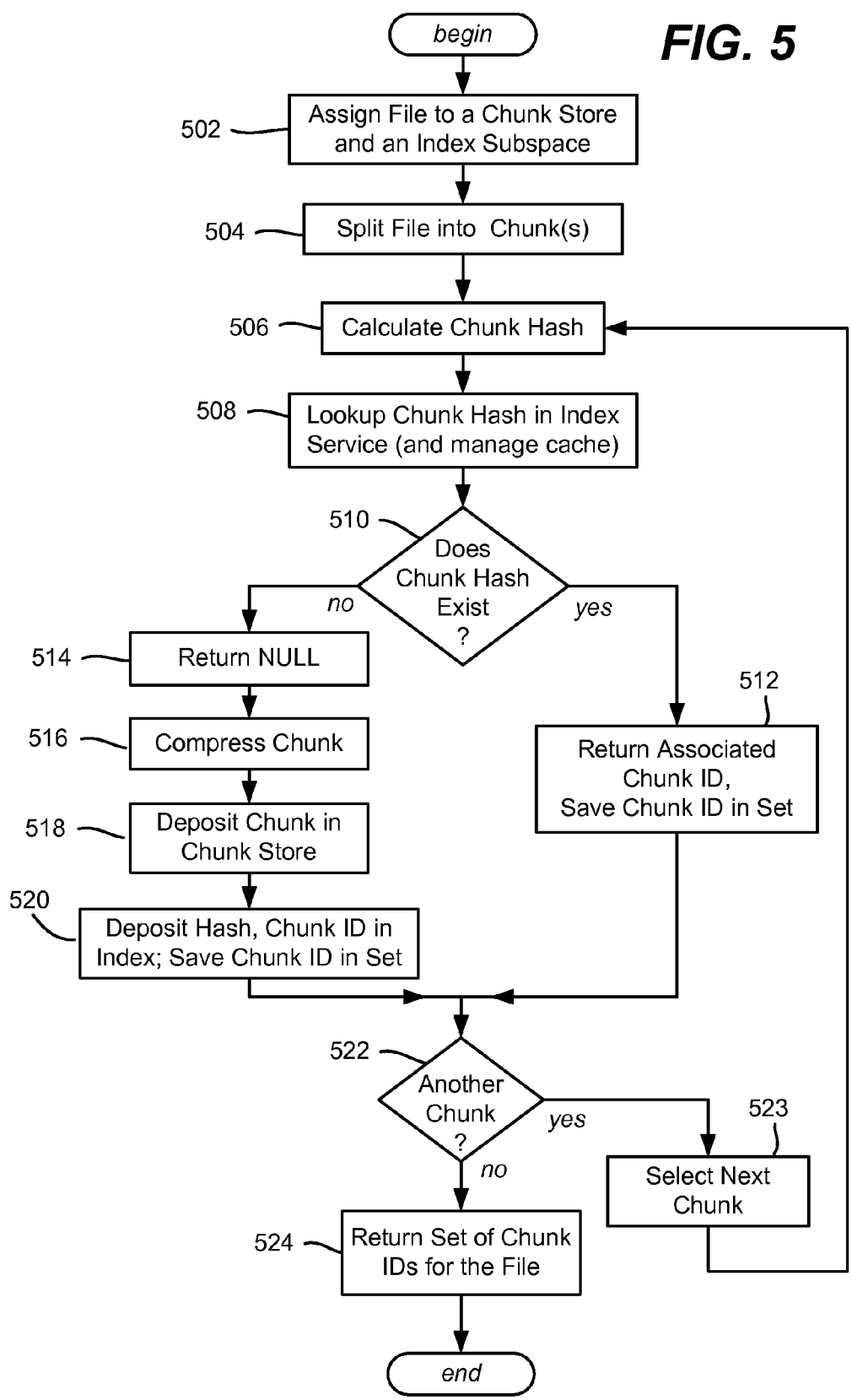
FIG. 5 is a flow diagram representing example steps for deduplication of data in which less than an entire index is cached, facilitating subspace-based deduplication.

By way of summary and to provide some additional details, FIG. 5 is a flow diagram representing steps that take place when a new file is written into a file storage service 102 configured for subspace partitioning. At step 502, the file is assigned a chunk store and an index subspace so that new chunks, if any, and its hash index can be deposited. Step 504 represents using a content-aware chunking module to split the file into chunks (although it is possible for an entire file to be a single chunk).

At step 506, the chunk hash is calculated via a secure hash function, e.g., SHA-256. Note that one option is to compress the chunk, if appropriate, before computing the chunk hash.

As represented via steps 508 and 510, the chunk hash is checked against the current cache (or caches) of the hash index service, which includes a current subspace for adding any new hashes, and possibly other (e.g., read-only) subspaces as memory allows. If at step 510 the chunk hash exists in the current cache of the hash index service, the associated chunk ID of the prior chunk is returned at step 512. Otherwise, a null value is returned at step 514, indicating that the chunk hash was not found in a current cache of the hash index service.

Note that via subspace indexing, (and possibly other factors such as generally described in the aforementioned patent application entitled "Adaptive Index for Data Deduplication"), only a portion of an entire hash index may be kept in a memory cache by the hash index service, that is, the hash index service may selectively cache a portion of the hashes for the subspaces in the system. Thus, it is possible that the chunk hash indeed exists in the secondary storage of the hash index service, but is not found immediately by checking the current cache. The chunk hash access of the hash index service (step 508) triggers cache management of such a look-ahead cache in the hash index services. Depending on the hash hit pattern, the hash index service intelligently manages the current cache depending on the available memory resources. The hashes of least recently used subspaces are not cached, leaving memory for caches of more actively used subspaces. In addition, hashes in less-frequently used subspaces may be sub-sampled (as generally described in the aforementioned patent application entitled "Adaptive Index for Data Deduplication"), to reduce memory consumption. Note that aside from the current subspace, in which new hashes are being added, the other subspaces in the hash index service may be read-only, in which event the cache replacement strategy is for a read-only cache, which is relatively straightforward to implement and manage. Further note that cache management may use the signatures associated with the subspaces.

Step 516 represents optionally compressing the chunk, e.g., via a LZW algorithm or its variant; (note that chunk compression may instead occur prior to step 506). The compression may be different for different types of data. Further note that not all data compresses well, and thus step 516 may not be performed for certain types of data, or may not be performed at all.

As represented by step 518, when the hash index service returns null (step 514), the chunk is deposited to the chunk store, with a chunk ID returned indicating the position (offset) of the chunk in that store. At step 520, the hash of the chunk and the chunk ID are deposited in the current subspace of the hash index service. Note that in this process, only the chunk store writing operation at step 518 needs to be persisted before the chunk is considered to be successfully written. The chunk hash and chunk ID pair may be written (step 520) in a lazy fashion to the current subspace of the hash index service. In the event that the writing operation of the subspace fails, e.g., due to power failure or the like, the hash index service may scan the chunk store and reconstruct the chunk hash and chunk ID pair to rebuild the unwritten part of the index subspace of the hash index service.

Steps 522 and 523 return to step 506 to repeat the process for any remaining chunks. When all of the chunks for the entire file have been persisted in the chunk store, or found to be a duplicate copy with chunk ID, the set of chunk IDs for the entire file is returned at step 524. These are used to form a stream map of the file, to allow the file data to be accessed from the chunk store when needed via the chunk IDs.

An alternative implementation at this stage is to instead return the chunk hashes of the chunks of the entire file, as well as the current subspace. The alternative approach uses hashes in the stream map to identify the chunks. The alternative implementation has advantages and disadvantages, as described herein.

More particularly, there are alternative implementations of the subspace-based hash index service, having different implementation choices for chunks, chunk id, hash, and reference counts. As generally described herein, in data deduplication, a chunk is the fundamental unit for data deduplication, and deduplication is accomplished by finding chunks that have the same hash value and storing only one copy of the chunk. In a simple implementation, chunks do not overlap. As also described herein, each chunk is identified with a chunk ID, which is a reference in the file storage service to locate the chunk. Because each chunk is stored in a chunk store, the chunk ID is a number pair (k, off), which identifies the chunk as stored in chunk store $S_k$, at offset off. Each chunk is uniquely identified by its hash, which is normally computed by applying the hash function on the compressed chunk stream; (in a concept referred to as hierarchical chunking, the hash of the parent chunk can also be calculated by directly applying the hash on the hashes value of its children chunks).

A file in the file storage service is identified by its compositing chunks. This can take the form of either chunk ID, or hashes. Thus, the file can be described as:

File={Chunk $ID_1$, Chunk $ID_2$, . . . , Chunk $ID_m$} or

File={$Hash_1$, $Hash_2$, . . . , $Hash_m$}

These two approaches are referred to as the chunk ID description scheme, and the hash description scheme, respectively. The Chunk ID description scheme has been generally described above, and thus the following describes the hash description scheme.

In the hash description scheme, the file descriptor contains a relative reference, namely the hash of the chunk. A second table, in this case, the <hash, chunk_id, ref_count> mapping table in the hash index service, is consulted to obtain the location of the chunk. This adds one additional level of indirection during file access, and may decrease the read access performance during file access. However an advantage is that the deduplication operation (and a garbage collection operation) may be performed more quickly.

In the hash description scheme, there is no need to maintain another chunk ID table. The subspace corresponds directly to a chunk store. Because the number of hashes in the data/file storage service may be huge, and the scheme assumes that not all hashes may be loaded in the main system memory, the file descriptor needs to further record the subspace in which the hashes are deposited, or in which the hashes are later deduplicated. Through the subspace information, the file storage service is given a hint of which subspace it needs to consult to retrieve the chunk_id of the relevant chunk.

Thus, one file descriptor takes the form:

File={$Hash_1$, $Hash_2$, . . . , $Hash_m$, $P_1$, . . . , $P_k$} in which $P_1$, . . . , $P_k$ represent the indexes of the Subspaces. When the file is accessed, a lookup operation is performed, e.g., lookup $hash_1$, $hash_2$, . . . , $hash_m$ in the hash index service to retrieve the relevant chunk_id information.

Note that because each hash corresponds to a unique chunk, when looking for some $hash_i$, if a $hash_j$ is found that is the same as $hash_i$ but in a different subspace, the corresponding chunk ID of $hash_j$ can be used to retrieve $hash_i$. (The two chunks corresponding to $hash_j$ and $hash_i$ are deduplicable, such as later during reconciliation as described below.)

If the corresponding hash is not found in the current cache of the hash index service, the hashes of subspaces $P_1$, . . . , $P_k$ are loaded into the current cache. If memory is exhausted, the hashes of least recently used subspace are removed to provide more memory.

The operation of the data deduplication is straightforward. When destination subspaces $P_i$ are deduplicated against source subspace $P_j$, the hashes of the source subspaces $P_j$ are loaded into memory. Then, each hash of the destination subspace $P_i$ is checked against the hashes of the source subspace $P_j$. Whenever a duplicate is found, its hash in the destination subspace is removed.

The associated chunk store garbage collection operation on a chunk store Sj can also be performed in a straightforward manner, as follows:

1. Load hashes of subspaces $P_1$, . . . , $P_k$ associated with the chunk store $S_j$. Copy the stream of source chunk store $S_j$ to a new destination chunk store $S_k$; the chunks whose hashes are found in the subspaces $P_1$, . . . , $P_k$ are copied over. Any chunk whose hash is not found in the subspaces $P_1$, . . . , $P_k$ is not copied.

2. The subspaces $P_1, \ldots, P_k$ are updated with the chunk ID in the new destination chunk store $S_k$.

3. The source chunk store $S_j$ may then be deleted.

Because there is no backward reference link in hash description scheme, both the deduplication optimization and the garbage collection operation are straightforward.

Turning to subspace reconciliation, which typically occurs during off-peak time when the system has a relatively low work load and available system resources, subspace reconcile operation may be performed to find and remove a duplicated entry among the subspaces, and thus remove a duplicated chunk. Note that the reconciliation operation may be interrupted if significant user and/or system activity is detected. In the case of interruption, the hash index service will use one of the subspaces, e.g., subspace A if subspaces A and B are being reconciled.

There are various ways to perform reconciliation, including reconciling each subspace with each other subspace. Note that a subspace may be reconciled with multiple subspaces at the same time, e.g., as memory space allows. Further, note that not all subspaces need to be loaded at the same time, or even in the same session, e.g., a subspace X may be reconciled against subspaces A, B and C, and then later reconciled against subspaces D and E, for example.

Another way to reconcile subspaces is to reconcile a new subspace with the others which have already been reconciled with each other. For example, if subspaces are added to the deduplication system one at a time, then that added subspace may be reconciled against the others (e.g., which have likewise been reconciled one at a time when each was added, and need not be reconciled with each other again), and so on.

Another way is by types of subspace, e.g., corresponding to the partitions. For example, groups of subspaces may be defined based on those having the same file type or data type. Reconciliation may be limited to the subspaces in the same group, e.g., as it is likely that the subspaces of a group of subspaces for text data will reconcile well with one another, but it is not likely that such subspaces will reconcile well with subspaces for indexing image data.

Figure 6:
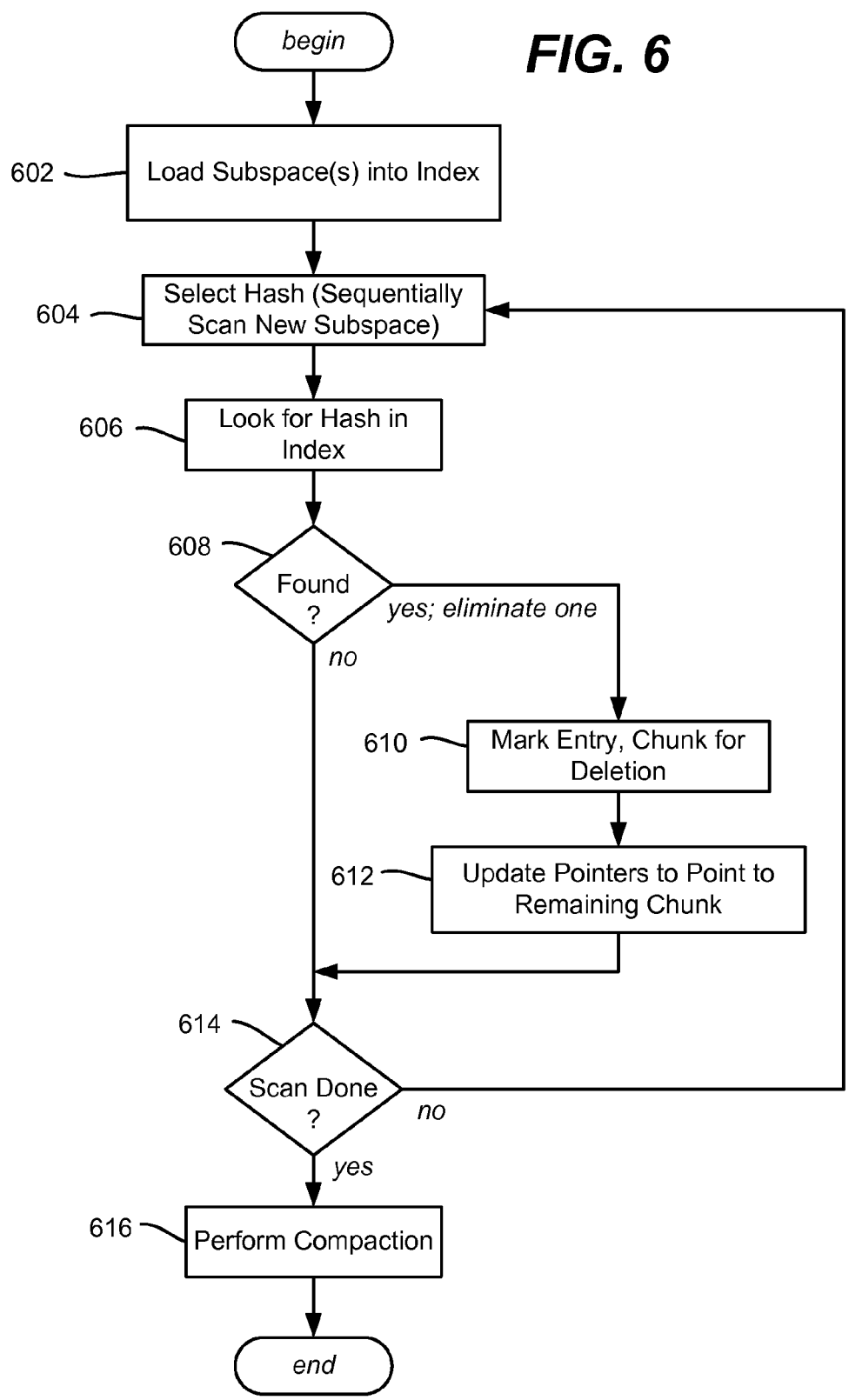
FIG. 6 is a flow diagram representing example steps for reconciling two subspaces to locate identical entries corresponding to identical chunks in a chunk store.

FIG. 6 is a flow diagram showing example steps of reconciliation of one subspace with one or more other subspaces. Step 602 represents loading the one or more other subspaces into memory as an index; note that indexing may be expensive in terms of memory consumption, while scanning for hashes is cheap because it uses sequential read I/O to scan, and therefore it may be advantageous to index the smaller set of sub-spaces and scan the larger set. Step 604 begins scanning the subspace to reconcile, e.g., sequentially selecting hashes one at a time, and looking for a matching hash in the index (step 606). If no matching hash is found (step 608), then the next hash is selected and the process repeats (step 614) until this subspace has been reconciled.

If a matching hash is found at step 608, the step 610 marks the subspace hash entry and the chunk for deletion. Step 612 updates the pointers of any file or other entity that references the chunk to be updated to the newly deduplicated chunk; note that a database of chunks and files that reference the chunks is maintained, so that the files may be found and updated. When no file or other entity references the chunk, the subspace hash entry and chunk may be safely deleted, e.g., as described below with respect to compaction at step 616.

As described above, the process repeats via step 614 until the subspace has been reconciled against the loaded index (the entries of one or more subspaces). At this time, compaction may be performed as represented by step 616, although compaction may take place at a later time, e.g., in a garbage collection-type operation.

Compaction may take place by copying the remaining index entries of the reconciled subspace, that is, those not marked for deletion/elimination, to a new subspace. An alternative is to move index entries from the end of the subspace into the "holes" that exist in the subspace, that is, overwrite the ones marked for deletion. Chunk stores may be similarly compacted.

Compaction results a smaller subspace (and smaller chunk store or stores), which is allowed. Instead of using smaller subspaces (or chunk stores), the subspace may be reopened for adding new entries; for efficiency, the point at which the new entries start may be tracked, so that reconciliation may begin from that point since the previous entries were already found to not match during reconciliation. A smaller chunk store may be similarly reopened for adding new chunks.

In another alternative, instead of moving entries or chunks, a bitmap may be used to track where new entries may be added to a subspace, or new chunks added to a chunk store.

As can be readily appreciated, a new subspace may be reconciled against a set of one or more older subspaces (new-to-old reconciliation), however old-to-new reconciliation is also feasible, even though doing so generally involves more data movement. More particularly, during the reconciliation process, the file associated with the subspace that is deduplicated will incur high access cost, because the access of the file is more fragmented. The hash index service may choose which subspace to be deduplicated based on the access pattern of content to improve the access performance, e.g., so that a popular file is not too fragmented. The hash index service also may coordinate reconciliation to balance between the deduplication saving and the amount of fragmentation.

For example, consider two subspaces A and B which resemble each other, and the subspace B is observed to be accessed (either read or updated) more frequently than the subspace A, or the subspace B contains a newer version of content of subspace A so that subspace A can be considered more of a version history of subspace B and is expected to be accessed less frequently. The hash index service may choose to deduplicate subspace A against subspace B, so that the more frequently accessed subspace B retains better access performance.

In an alternative embodiment, the chain of deduplication may be limited to control the cost of file access. With deduplication optimization, the number of I/O operations needed to access a file can be evaluated by calculating the number of branches in a deduplication graph. For example, if the subspace A is deduplicated against the subspaces B and C, while subspace B is further deduplicated against subspace D, there are three branches in the deduplication graph, and the number of I/O accesses to a file associated with the subspace A is 4 (=3+1). To limit the number of I/O to accesses of a file to be no more than K, then the reconciliation tree cannot have more than K−1 branches.

If the deduplication system is storing periodical backup data, e.g., $B_0$ for day 0, $B_1$ for day 1, $B_2$ for day 2, and so forth, to ensure that the restore of the most recent backup is performed reasonably efficiently, e.g., to incur not more than K access, the deduplication optimization and reconciliation operation can be performed as follows. First, store a full backup for day 0 into $B_0$. When the day 1 backup $B_1$ is performed, it is deduplicated against $B_0$. When the day 2 backup $B_2$ is performed, it is deduplicated against $B_0$ and $B_1$, and so forth. On day K, a full backup $B_k$ is performed, and then a reconciliation operation is applied to deduplicate the backup of $B_0$ against that of $B_k$. The day K+1 backup $B_{K+1}$ is deduplicated against $B_k$, while the day K+2 backup $B_{k+2}$ is deduplicated against $B_K$ and $B_{K+1}$. At day 2K, a full backup $B_{2k}$ is performed, and then a reconciliation operation is applied to deduplicate the backup of $B_K$ against that of $B_{2k}$.

In many environments, there are too many subspaces/insufficient resources to reconcile all subspaces with each other. In such a situation, a selection mechanism of the hash index service is used to select which subspaces to reconcile. As described herein, in the hash index service, the hashes of the file storage service are split into subspaces to allow the hash index service to scale, and one or more signatures can be calculated for each subspace so that the subspace can be compactly represented. The signatures of the subspace are loaded in the hash index service (for one, to determine which subspace is to be loaded/unloaded by the cache management unit of the hash index service, and at what sampling rate), and which two subspaces are to be reconciled in a further data deduplication.

To this end, in general, during the reconciliation operation, the hash index service examines the signatures (or other representative data) of the index subspaces in the system, and based on the signature calculates the resemblance between any two subspaces to determine the potential deduplication saving between the two subspaces. Because the subspace signatures are very compactly represented, the operation of finding subspaces to deduplicate can be performed very quickly.

The signature of the subspace can take various forms. Let subspace $P_j$ comprise a set of hashes $h_{j,1}, h_{j,2}, \ldots, h_{j,l}$. A number of sample signatures of subspaces $P_j$ are:

1. Min hash or its variant (e.g., with a hash value close to a particular constant); max hash is one such variant, for example.

$$Sig_1(P_j) = \min\{h_{j,1}, h_{j,2}, \ldots, h_{j,l}\}$$

2. k-min hash or its variant.

$$Sig_2(P_j) = \text{a set of } k\text{-minimal hash values among } \{h_{j,1}, h_{j,2}, \ldots, h_{j,l}\}$$

Other algorithms that can produce a set of k deterministic hash values from the full hash value set can be used as well, e.g., the signature can be k hash values that are closest to a constant H.

3. Bloom filter
    The signature is a bloom filter formed by the full hash value set $\{h_{j,1}, h_{j,2}, \ldots, h_{j,l}\}$.
4. k-min hash+bloom filter.
    The signature is a bloom filter formed by k-minimal hash values obtained in 2.
5. b-bit minwise hash (as described in P. Li, and A. C. Konig, "b-Bit Minwise Hash", WWW 2010).
    The signature is formed by a b-bit minwise hash over the full hash value set $\{h_{j,1}, h_{j,2}, \ldots, h_{j,l}\}$.
6. k-min hash+b-bit minwise hash.
    The signature is formed by a b-bit minwise hash over k-minimal hash values obtained in 2.

For each signature calculation method, a resemblance metric $R(P_i, P_j)$ is defined, representing how similar (i.e., deduplicable) are two subspaces. In one implementation, the resemblance metric $R(P_i, P_j)$ takes a value from 0 to 1; the larger the resemblance metric, the more probable that there are significant deduplication opportunities between the subspaces $P_i$ and $P_j$. The resemblance metric of each signature may be:

1. Min hash:
    $R(P_i, P_j)=1$, if the min hash of the two subspaces are equal,
    $R(P_i, P_j)=0$, otherwise.
2. K-min hash:
    $R(P_i, P_j)=q/k$, if there are q equal (common) min hashes among subspaces $P_i$, $P_j$.
3. Bloom filter and/or k-min hash+Bloom Filter:

$$R(P_i, P_j) = \frac{|\text{Bloom\_Filter}(P_i) \cap \text{Bloom\_Filter}(P_j)|}{|\text{Bloom\_Filter}(P_i) \cup \text{Bloom\_Filter}(P_j)|}$$

$$= \frac{|BloomFilter(P_i \cap P_j)|}{|BloomFilter(P_i \cup P_j)|}$$

$$\cong \frac{|P_i \cap P_j|}{|P_i \cup P_j|}$$

(Note that a known property of bloom filters is that the bitwise AND between two bloom filters, which are array of bits, represents a bloom filter that contains the "intersection" of the two sets Pi and Pj. Also, the bitwise OR between two bloom filters is a bloom filter representing the union of the two sets Pi and Pj. Further, the "length" operator, which can be implemented as simply counting the number of bits in the bloom filter, represents a way to estimate the number of hash values inserted in the bloom filter. To conclude the formula above, this metric approximates the amount of commonality between the two sets.)

4. b-bit minwise hash and/or k-min hash+b-bit minwise hash
    (comparison based on algorithm 1 in P. Li, and A. C. Konig, "b-Bit Minwise Hash", WWW 2010).

Note that the various subspaces can be compared with one another, forming a distance map or other cluster-like arrangement. Selection may be based on such clustering of subspaces.

Once the subspaces to be reconciled are identified, deduplication can be performed between the selected subspaces as described above, e.g., subspace A against subspace B. The reconciliation may be performed by loading the hash indexes of the subspace B into memory, e.g., into a hash table.

In an alternative, a deduplicated subspace A' of A may be generated during reconciliation, if memory permits, essentially performing compaction dynamically. To this end, for each hash index entry in subspace A, the process checks if the same hash entry already exists in subspace B. If the hash does not exist, in this alternative the hash index entry is added to subspace A'. If the hash already exists, the hash index entry in subspace A can be deduplicated, and be effectively "removed" from subspace A by not adding it to the subspace A'. After the entire subspace A has been deduplicated against subspace B, the original subspace A can be removed and be replaced with the compacted/deduplicated subspace A'.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
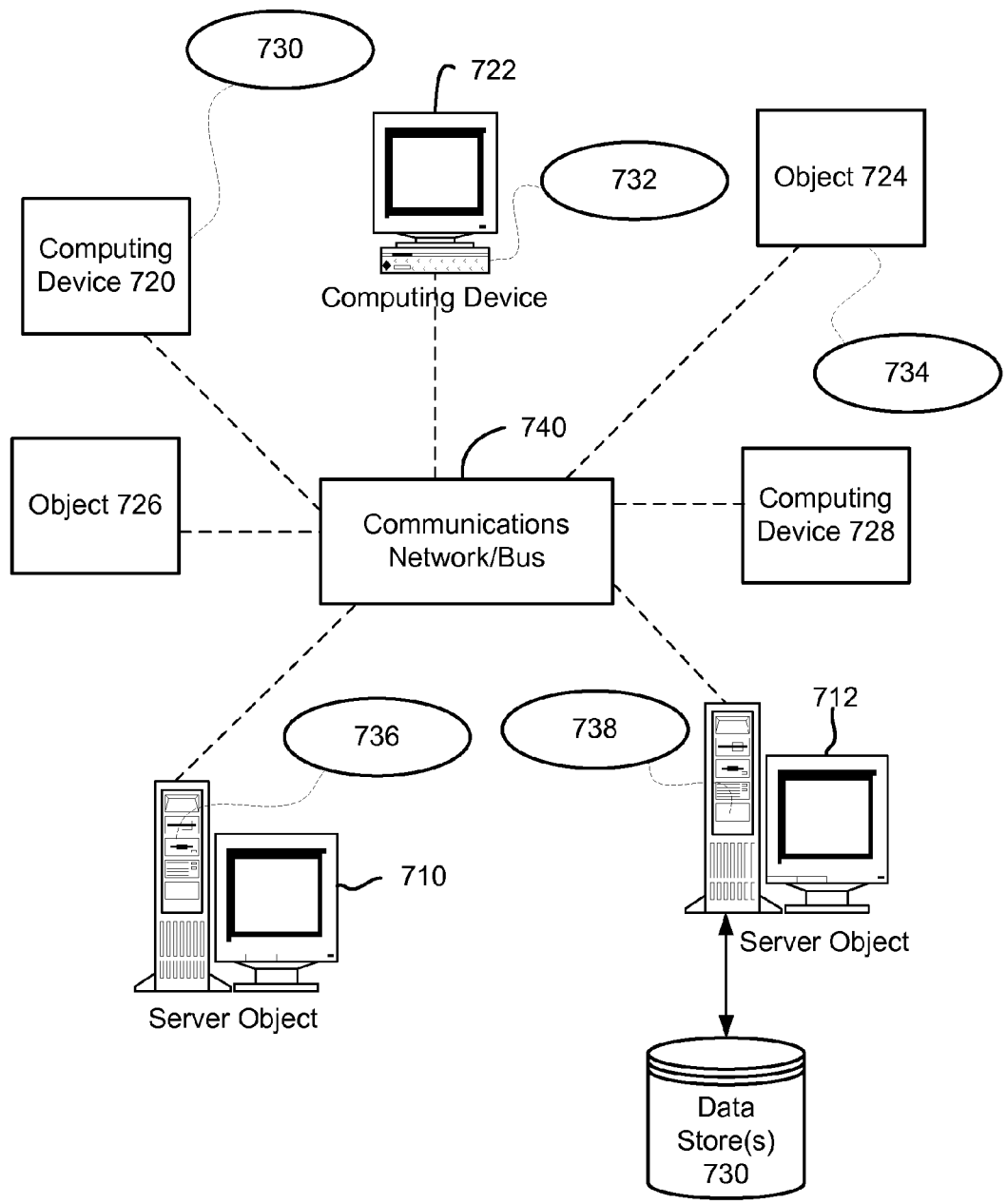
FIG. 7 is a block diagram representing exemplary non-limiting networked environments in which various embodiments described herein can be implemented.

FIG. 7 provides a schematic diagram of an exemplary networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
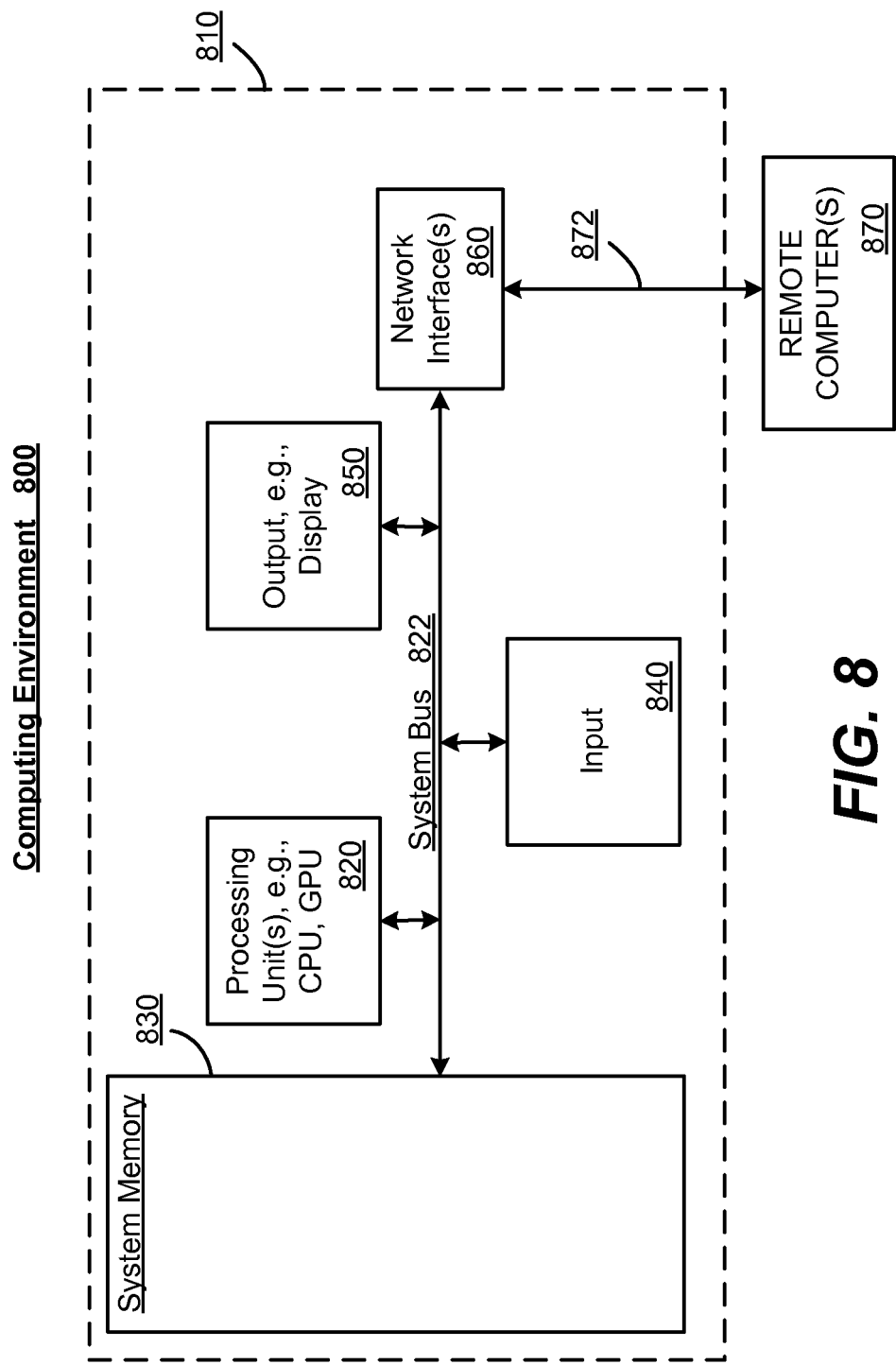
FIG. 8 is a block diagram representing an exemplary non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary remote device for implementing one or more embodiments includes a general purpose computing device in the form of a computer 810.

Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
loading a subspace index comprising less than all index entries of a hash index service from a secondary media into a primary memory cache in which the subspace index corresponds to a partitioning of a global index into separately optimized subspaces;
reconciling at least two of the subspaces to remove at least one duplicate chunk, including using a resemblance metric to compare a subspace and another subspace by determining a similarity between at least one signature representative of the subspace and at least one signature representative of the other subspace; and
using the subspace index to deduplicate a dataset, including chunking the dataset into one or more chunks, and for each chunk, determining whether a hash value computed for that chunk matches a hash value of an entry in the primary memory cache, and if not, storing the chunk and adding an entry for that hash value into the subspace index in association with a reference to that chunk, and if so, returning information by which the existing chunk is locatable.

2. The method of claim 1 further comprising, loading at least part of another subspace index into the primary cache.

3. The method of claim 1, wherein partitioning the data comprise partitioning based upon machine location, storage volume location, data location, learned criteria or adaptive criteria, or any combination of machine location, storage volume location, data location, learned criteria or adaptive criteria.

4. The method of claim 1 wherein returning the information by which the existing chunk is locatable comprises returning a chunk identifier comprising a reference to the chunk that is associated with the entry, or returning the hash value and an identifier of the subspace.

5. The method of claim 1 further comprising, reconciling the subspace with another subspace, or reconciling another subspace with the subspace, wherein reconciliation removes at least one duplicate data chunk from at least one subspace.

6. The method of claim 5 further comprising, determining whether to reconcile the subspace with another subspace or reconciling another subspace with the subspace based upon deduplication saving, fragmentation, data access performance, or data movement, or any combination of deduplication saving, fragmentation, data access performance, or data movement.

7. The method of claim 5 wherein reconciling the subspace comprises marking an entry in the subspace for deletion when that entry is a duplicate entry of an entry in the other subspace, updating each reference to the chunk associated with the duplicate entry to a reference to another chunk associated with the other entry, and compacting the subspace to eliminate the duplicate entry.

8. The method of claim 5 wherein reconciling the subspace comprises creating a modified subspace, copying an entry in the subspace into the modified subspace when that entry does not match an entry in the other subspace, and when that entry is a duplicate of an entry in the other subspace, updating each reference to the chunk associated with the duplicate entry to a reference to the matching chunk associated with the other entry, and not copying the entry in the subspace into the modified subspace.

9. The method of claim 5 further comprising, forming a cluster comprising the subspace and the other subspace based upon a criteria or signature similarity.

10. The method of claim 9 wherein the information by which the existing chunk is locatable comprises the hash value, and further comprising, locating the chunk by accessing a secondary per-subspace index that maps to a physical location of the chunk.

11. The method of claim 9 further comprising computing the signature for the subspace based upon a k-min hash computation or a variant of k-min hash, or based upon any combination of a k-min hash computation or a variant of k-min hash.

12. The method of claim 9 further comprising computing the signature for the subspace based upon a bloom filter or a k-min hash computation combined with a bloom filter, or based upon any combination of a bloom filter or a k-min hash computation combined with a bloom filter.

13. The method of claim 9 further comprising computing the signature for the subspace based upon a min hash computation, a b-bit minwise hash computation or a k-min hash combined with a b-bit minwise hash computation, or based upon any combination of a b-bit minwise hash computation or a k-min hash combined with a b-bit minwise hash computation.

14. The method of claim 1 further comprising computing the signature for the subspace based upon a min hash computation or a variant of min-hash, or based upon any combination of a min hash computation or a variant of min-hash.

15. In a computing environment, a system, comprising, at least one processor, a memory communicatively coupled to the at least one processor and including components comprising, a hash index service coupled to a data storage service, the hash index service configured to determine whether a hash value computed for a chunk of data being deduplicated matches an existing hash value in a primary memory cache that includes a subspace index comprising hash values for chunks and does not include all of the index entries of the hash index service, and if so, to return information by which the existing chunk is locatable, and if not, to notify the data storage service to store the chunk, the hash index service further configured to add an entry for that hash value into the subspace index in association with information by which the added chunk is locatable, and a reconciliation mechanism configured to compute a signature for a portion of the hash values that comprises the subspace index and use signature similarity to reconcile the subspace index with another subspace index.

16. The system of claim 15, wherein the reconciliation mechanism reconciles the subspace with the other subspace, by detecting any duplicate entries in the subspaces, and for each duplicate entry detected, taking action to eliminate one of the duplicate entries, update any reference or references to a chunk associated with that duplicate entry, and to remove the chunk associated with that duplicate entry.

17. One or more computer-readable storage memory having computer executable instruction, which when executed perform steps, comprising:
reconciling a subspace index with one or more other subspaces, wherein the subspace index comprises less than all index entries of hash index service corresponding to a dataset, wherein identical chunks in the subspace index and the one or more other subspaces are stored in different locations, including (a) selecting a hash value in the subspace index; (b) determining whether the hash value matches a hash value in the one or more other subspaces, and if not, advancing to step (d); (c) eliminating the duplicated hash value in the subspace by marking the duplicated hash value in the subspace index for deletion, updating each reference to a chunk associated with the duplicate hash value to a reference to another chunk associated with the other entry, and compacting the subspace to eliminate the duplicate entry; and (d) returning to step (a) for a plurality of different hash values.

18. The one or more computer-readable storage memory having computer-executable instructions of claim 17, wherein the subspace index comprises an actively used subspace, wherein each subspace contains a set of hash values and associated metadata that points to the chunk associated with each hash value, and wherein eliminating the duplicated hash value in the subspace further comprises updating any reference to a chunk associated with the hash value in the subspace, eliminating an entry in the subspace that contains the hash value, and deleting the chunk associated with the hash value in the subspace.

19. The one or more computer-readable storage memory of claim 17 having further computer-executable instructions, comprising, selecting the subspace and the one or more other subspaces based upon similar subspace types, similar subspace signatures, or based upon the subspace being an unreconciled subspace and the one or more other subspaces comprising a plurality of subspaces previously reconciled with one another, or any combination of similar subspace types, similar subspace signatures, or based upon the subspace being an unreconciled subspace and the one or more other subspaces comprising a plurality of subspaces previously reconciled with one another.

20. The one or more computer-readable storage memory of claim 17 wherein eliminating the entry in the subspace comprises not copying the entry to a new subspace, or compacting the subspace by marking the entry that contains the hash value as marked for elimination, and eliminating the entry by copying only non-marked entries to a new subspace after reconciliation, or overwriting the entry marked for elimination with a non-marked entry.

\* \* \* \* \*